United States Patent [19]
Gupta et al.

[11] Patent Number: 5,756,263
[45] Date of Patent: May 26, 1998

[54] METHOD OF INVERTING FERROELECTRIC DOMAINS BY APPLICATION OF CONTROLLED ELECTRIC FIELD

[75] Inventors: Mool C. Gupta, Webster; Alan C. G. Nutt, Rochester, both of N.Y.

[73] Assignee: Eastman Kodak Company, Rochester, N.Y.

[21] Appl. No.: 452,931

[22] Filed: May 30, 1995

[51] Int. Cl.$^6$ ............................................ G03C 5/00
[52] U.S. Cl. .................... 430/317; 430/311; 430/312; 430/315; 359/328; 385/122
[58] Field of Search ........................ 430/311, 312, 430/313, 315, 317; 359/328; 385/122

[56] References Cited

U.S. PATENT DOCUMENTS

| | | | |
|---|---|---|---|
| 5,150,447 | 9/1992 | Tamada et al. | 385/130 |
| 5,157,754 | 10/1992 | Bierlein et al. | 385/122 |
| 5,193,023 | 3/1993 | Yamada et al. | 359/245 |
| 5,249,191 | 9/1993 | Sawaki et al. | 372/22 |
| 5,249,250 | 9/1993 | Yamada et al. | 385/122 |
| 5,526,173 | 6/1996 | Yamaguchi et al. | 359/328 |

OTHER PUBLICATIONS

Lim et al, Elec Lett., vol. 25, 1989, p. 174.
Yuhuan Xu, Ferroelectric Materials and Their Applications, Elsevier Science Publishers B.V. 1991, 233.
Yamada et al, First–Order Quasi–phase Matched LiNbO3 Waveguide Periodacally Poled by Applying an External Field for Efficient Blue Second–Harmonic Genetation, Appl. Phys. Lett 62(5) Feb. 1, 1993, pp. 435–436.
Matsumoto et al, Quasiphase–Matched Second Harmonic Generation of Blue Light in Electrically Periodically–Poled Lithium Tantalate Waveguides, Elec. Lett., (27) 22 24 Oct. 1991, pp. 2040–2042.
Yamamoto et al, Characteristics of Periodically Domain–Inverted LiNbO$_3$ and LiTaO$_3$ Waveguides for Second Harmonic Generation, J. Appl. Phys. 70(4), 15 Aug. 1991, pp. 1947–1951.
Magel et al, Quasi–phase matched seond–harmonic generation of blue light in periodically poled LiNbO$_3$, Appl. Phys. Lett. 56(2), 8 Jan. 1990 pp. 108–110.
Lim et al, Elec. Lett. 25(11), 25 May 1989, pp. 731.
Makio et al, Fabrication of periodically inverted domain structures in LiTaO$_3$ and LiNbO$_3$ using Proton Exchange, Appl. Phys. Lett. 61(26) 28 Dec. 1992, pp. 3077–3079.
Yamada et al, Elec. Letters (27), p. 828.
Hsu et al, Appl. Phys. Lett. 60(1), 6 Jan. 1992, p. 1.
Gupta et al, Appl. Phys. Lett. 63(9), p. 1167.
Myers et al, High Voltage Repoling of Lithium Nionbate, Center for Nonlinear Optical Materials, Stanford, CA, Jul. 1993.

*Primary Examiner*—S. Rosasco
*Attorney, Agent, or Firm*—Raymond L. Owens

[57] ABSTRACT

A method for forming inverted ferroelectric domain regions in a substrate including ferroelectric material and having two major opposite surfaces. The method includes application of controlled electric field in selected regions to inhibit subsequent nucleation and growth of selected domains; applying a conductive electrode over the opposite major surfaces; and providing a voltage to the conductive electrodes having a sufficient magnitude and duration to cause the ferroelectric polarization to invert in selected unmodified regions.

17 Claims, 4 Drawing Sheets

METHOD OF INVERTING FERROELECTRIC DOMAINS BY APPLICATION OF CONTROLLED ELECTRIC FIELD

CROSS REFERENCE TO RELATED APPLICATION

Reference is made to commonly assigned U.S. patent application Ser. No. 260,935 filed Jun. 16, 1994, entitled "Forming Inverted Ferroelectric Domain Regions" by Cynthia J. Baron et al, the disclosure of which is incorporated by reference.

FIELD OF THE INVENTION

The present invention relates to optoelectronic devices and methods of making them wherein such devices use inverted ferroelectric domain structures.

BACKGROUND OF THE INVENTION

Compact laser light sources are presently available only in near infra-red to red visible wavelengths. However, there are many applications for compact lasers in the visible spectrum i.e. 400–700 nm, which are currently being implemented using gas or larger solid state lasers due to the lack of available compact visible light sources. Coherent light in the blue wavelength range, for example, permits the optical recording density for diffraction limited focusing to be approximately four times that of current laser wavelengths. For these applications, low cost and compactness are necessary attributes. Higher resolution laser printing and displays will benefit from the economical availability of blue light sources. Several techniques to achieve compact visible laser sources are being developed for a variety of applications. In particular, the method of frequency doubling uses commercially available infra-red emitting III–V laser diodes to pump nonlinear optical crystals that can produce visible light via second harmonic generation (SHG). A convenient method to implement SHG at usable power levels, quasi-phase matching in a waveguide, has been described by Lim et al, Electronics Letters, vol. 25 1989, p. 174 and involves the use of periodically poled ferroelectric domain regions to phase match the pump and second harmonic radiations, achieving high SHG efficiencies.

Single crystal materials such as $LiNbO_3$ and $LiTaO_3$ and KTP which are used in compact optical devices such as interferometers, modulators, mode converters, scanners, polarization transformers, and can also be used as bulk or waveguide quasi-phase matched second harmonic generators. These materials have large nonlinear optical coefficients, are transparent in the visible range, and single or multi mode waveguides can be easily formed by ion exchange processes. (See Yuhuan Xu, Ferroelectric Materials and Their Applications, Elsevier Science Publishers B.V. 1991, 233). Precise formation of inverted ferroelectric domain regions (patterning of the direction of the ferroelectric polarization) in non-linear optical materials is necessary to obtain usable efficiencies in quasi-phase matched second harmonic generation. Inverted domain regions are also useful for other electro-optic devices such as modulators or scanners, and may be useful in other devices such as pyroelectric detectors, etc.

Several methods of forming inverted ferroelectric domain regions in ferroelectric materials are currently in use. A common method for ferroelectric domain inversion in ferroelectric materials is the patterned application of electric fields stronger than the materials' coercive field in the desired domain direction, achieved via patterned metal electrodes. This is performed either at room temperature or at elevated temperatures. (See "First-Order Quasi-Phase Matched $LiNbO_3$ Waveguide Periodically Poled by Applying an External Field for Efficient Blue Second-Harmonic Generation", M. Yamada et al, Appl. Phys. Lett. 62(5), 1 Feb. 1993, 435–436 and "Quasiphase-Matched Second Harmonic Generation of Blue Light in Electrically Periodically-Poled Lithium Tantalate Waveguides", S. Matsumoto et al, Electronic Letters, (27) 22, 24 Oct., 1991, 2040–2042). Another widely used method of forming inverted ferroelectric domain regions on the surfaces is to chemically alter the Curie temperature of the material by diffusion. This process is either carried out at high temperatures or is followed by a heat treatment. (See "Characteristics of Periodically Domain-Inverted $LiNbO_3$ and $LiTaO_3$ Waveguides for Second Harmonic Generation", K. Yamamoto et al, J. Appl. Phys. 70(4), 15 Aug. 1991, 1947–1951. Other methods include unidirectional heating and simultaneous chemical treatment, ferroelectric domain inversion during growth of the crystal, or ferroelectric domain inversion by electron beam writing. (See "Quasi-phase matched second-harmonic generation of blue light in periodically poled $LiNbO_3$", G. A. Magel et al, Appl. Phys. Lett. 56(2) 8 Jan., 1990, 108–110 and U.S. Pat. No. 5,150,447 Hitoshi et al, issued Sep. 22, 1992).

Methods to invert ferroelectric domain regions by chemical diffusion or implantation processes are well known and all work using the same principle. Introducing or removing selected elements from the crystal by diffusion, implantation, etc. locally lowers the Curie temperature of the ferroelectric material. To invert the ferroelectric polarization in the selected areas, the devices are heated to a temperature that is higher than the locally lowered Curie temperature but below the Curie temperature of the bulk material. Diffusion processes such as high temperature Ti in-diffusion in $LiNbO_3$ as described by Lim et al, Electronics Letters, 25 (11) 731, published May 25, 1989, $Li_2O$ outdiffusion in $LiNbO_3$, or proton exchange in $LiTaO_3$ both described by Yamamoto et al, J. Appl. Phys. 70(4) 1947, published Aug. 15, 1991 and the latter in U.S. Pat. No. 5,249,191 by Sawaki et al or ion exchange in KTP as taught by Bierlein et al in U.S. Pat. No. 5,157,754 are commonly practiced. These diffusion controlled processes suffer several drawbacks. $Li_2O$ out-diffusion and Ti in-diffusion lower the photorefractive resistance of the material. (See "Characteristics of Periodically Domain-Inverted $LiNbO_3$ and $LiTaO_3$ Waveguides for Second Harmonic Generation", K. Yamamoto et al, J. Appl. Phys. 70(4), 15 Aug., 1991, 1947–1951. In quasi-phase matched second harmonic generation the maximum efficiencies are achieved with vertical domain walls passing through the waveguide region. Inverted ferroelectric domain shapes produced by diffusion processes, unfortunately are shallow and triangular for $LiNbO_3$ or shallow and semicircular for $LiTaO_3$, and are not optimum for modal overlap with the waveguide, leading to built-in decreases in the conversion efficiency. Refractive indices of the materials are also altered by the chemically diffused species, and additional steps are required if a homogeneous refractive index is desired. Furthermore, precise control of the diffusion patterned inverted domain shapes and dimensions are difficult and depend on several factors including time, temperature, heating rate, amount of chemical interaction, and the material pyroelectric and piezoelectric properties. These same processes are generally also used to fabricate waveguides, and require several additional processing steps in order to maintain single mode waveguides.

Another method of fabricating inverted ferroelectric domain regions is described by Makio et al, Appl. Phys. Lett. vol. 61, p. 3077 published Dec. 28, 1992 uses proton exchange in LiTaO$_3$ and LiNbO$_3$ in conjunction with one directional heating. (See "Fabrication of periodically inverted domain structures in LiTaO$_3$ and LiNbO$_3$ using Proton Exchange" Appl. Phys. Lett, 61(26), 28 Dec., 1992, 3077–3079). The stress from the proton exchange is thought to cause growth of the inverted domains under the temperature gradient. The domains are "spikelike" and originate from the proton-exchanged regions on the surface of the crystal. This method produces domains that are unstable, and under subsequent heat treatments the domain depths decrease. While the survival of domains up to 5 minutes at 380° C. is sufficient to fabricate waveguides, modulation of the nonlinear coefficients and refractive index due to the introduction of protons along the length of the waveguide severely hamper SHG and increase scattering. The inverted ferroelectric domains need to extend to the surface and exhibit no variation in refractive index or degradation of nonlinear coefficients for maximum efficiency.

Electron beam bombardment in "written" patterns has been demonstrated to invert ferroelectric domain regions in LiNbO$_3$, as taught by Yamada et al. in Electronics Letters, (27) p 828 published 10 May 9, 1991, and U.S. Pat. No. 5,249,250, LiTaO$_3$ as described by Hsu et al, Appl. Phys. Lett. 60(1) p 1 published Jan. 6, 1992, and KTP as described by Gupta et al., Appl. Phys. Lett. 63(9) p 1167, published Aug. 30, 1993. Electron beam bombardment suffers from the difficulty of producing large scale patterns, sensitivity of domain shape to processing conditions, penetration of the electron beam into the surface of the material, and surface damage due to the high fields involved, the latter of which both require removal of the surface layer prior to the waveguide fabrication for higher efficiencies.

Vertical walled inverted ferroelectric domain regions have also been demonstrated by the application of an external electric field that is higher than the coercive field of the material. Yamada et al, U.S. Pat. No. 5,193,023 teach the use of patterned electrodes on a nonlinear optical ferroelectric substrate to produce inverted domain regions. In publication, Yamada et al Appl. Phys. Lett. vol. 62, No. 5, p 435 published Feb. 1, 1993 describe patterned aluminum electrodes used on LiNbO$_3$ to produce inverted domain regions throughout the thickness of wafers less than 500 μm thick. The patterned portion of the electrode is developed on the +z face of the crystal because the inverted ferroelectric domain regions originate from the +z face. The −z face of the crystal is coated as a planar electrode. A negative pulse of 100 μsec is applied to invert the domains. The last step involves dissolving the electrodes in a suitable solution. Yamada et al reported lateral growth of the domain under the electrodes for longer pulse lengths, and in fact only short (3 mm) interaction lengths were produced. The control of the poling field pulses is critical in achieving the proper vertical walled domain pattern. The lack of longer interaction lengths are an affirmation of the irreproducibility of the process. The use of metal electrodes at extremely high fields also may cause decreased conversion efficiencies due to surface interactions.

Matsumoto et al, Electronics Letters, vol. 27, No. 22 p. 2040 published Oct. 24, 1991 used electric fringing fields from interdigital electrodes at high temperatures to produce surface inverted ferroelectric domain regions. Matsumoto reports a corrugation on the surface produced by the inversion operation of 20 nm, significant enough to cause waveguide losses. The high temperatures for this process, in conjunction with the electric fields applied cause diffusion of the electrode into the surface of the substrate which affects the nonlinear properties and significantly induces photorefraction. The ferroelectric materials also become significantly conducting at high temperatures.

Myers et al have presented work at the Center for Nonlinear Optical Materials, Stanford, Calif. July, 1993, entitled "High Voltage Repoling of Lithium Niobate". This work on LiNbO$_3$ crystals 0.5 to 1 mm thick involved both metal and dissolved salt electrodes, and pulsed electric fields much higher than the coercive field of the material for very short times. For the metal patterned electrodes, control of the domain shape is achieved by electric field pulse length and the number of pulses. The uniformity of the repoled regions was increased by the use of liquid electrodes. Patterned repoled regions in lithium niobate were achieved only through the use of patterned metal electrodes, as taught by Yamada, et al. Patterning of the liquid electrodes is nearly impossible for the dimensions required in efficient SHG.

The inversion of ferroelectric domain regions reproducibly is key to the development of SHG devices. Low efficiencies of conversion are primarily due to one or more of three primary defects: poor overlap of inverted region with waveguide, decreased NLO coefficients in inverted regions due to chemical or photorefractive effects, or poor control of domain shape, depth, and duty cycle. Chemical diffusion processes result in triangular or semicircular domain shapes which do not provide the optimum conditions for quasi-phase matching, and also can introduce refractive index variations. Both effects lead to decreased conversion efficiencies. On the other hand, existing electric field domain inversion techniques suffer from irreproducibility, electrode interactions, and nonuniformities in the inverted domain patterns, all of which are attributes of an uncontrollable process and poor efficiencies result.

SUMMARY OF THE INVENTION

The object of this invention is to provide an improved process for producing inverted ferroelectric domain regions in a ferroelectric material having a predetermined surface pattern, with the interfaces between the inverted domain volumes being an extension of said surface pattern.

Another object of this invention is to provide inverted ferroelectric domain regions with more desirable shapes and deeper into the material than those found through the use of chemical diffusion processes.

Another object of this invention is to lower the probabilities of surface damage or catastrophic breakdown.

Yet another object is to provide large area inverted ferroelectric domain regions which can be quickly and reproducibly formed without several additional process steps.

Yet another object is to provide a process which forms inverted ferroelectric domain regions that can be used either in waveguide or bulk applications.

It has been discovered, quite unexpectedly that patterns of inverted ferroelectric domain regions can be formed by inhibiting the growth of said domains in adjacent regions.

This objective is achieved by a method for forming inverted ferroelectric domain regions in a substrate including ferroelectric material and having two major opposite surfaces, comprising the steps of:

a. depositing a high electrical breakdown layer with high dielectric constant on a substrate surface typically between 0.2 μm to 0.5 μm thick;

b. applying conductive electrodes on the dielectric layer and the other substrate surface respectively; and c. providing a voltage across the conductive electrodes having a sufficient magnitude and duration to cause the ferroelectric polarization to invert in a controlled manner.

The following are advantages of the present invention. Deep, straight-walled inverted ferroelectric domain regions can be easily produced, often extending through the crystal thickness that duplicate the surface pattern, eliminating the problems with domain depth and ultimate domain shape encountered by chemical diffusion processes. This process is carried out at room temperature, lessening the chances for contamination of the material surfaces. In this process applied voltages can be the minimum required for ferroelectric domain inversion, minimizing the probability of catastrophic dielectric breakdown, surface damage, or lateral growth of domain regions. The process is applicable for large area inverted ferroelectric domain regions in surface or bulk applications. The simplest processing steps to date are described in this invention; features finer than 1.8 μm have been demonstrated at room temperature. Higher temperature processing (up to Curie temperature) may also be advantageous.

BRIEF DESCRIPTION OF THE DRAWINGS

FIG. 5c is a plot of voltage or switching current for the device of FIG. 5a;

DESCRIPTION OF THE PREFERRED EMBODIMENTS

Figure 1:
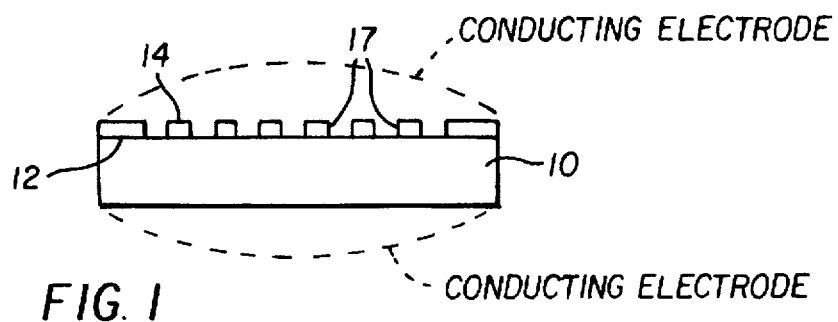
FIG. 1 shows in cross-section an inverted ferroelectric structure device.

Turning first to FIG. 1 there is provided a substrate 10 which is made of a ferroelectric material such as lithium tantalate, lithium niobate or potassium titanyl phosphate (KTP). These materials are crystalline. The substrate can include any ferroelectric material which exhibits useful optical properties. The top surface 12 is first cleaned by sequential immersion in cleaners and solvents such as dilute isoclean, acetone, and 2-propanol under ultrasonic power followed by a dip in HF+2HNO$_3$ and deionized water rinse or other suitable standard semiconductor cleaning procedure. A mask material 14 is applied onto surface 12 such as by a conventional sputtering technique. The mask material 14 can be, for example, Ta$_2$O$_5$, WO$_3$, HfO$_3$, and diamond like carbon. A photoresist layer (not shown) is applied over the mask material 14 and patterned to provide openings. An acid or ion beam etch is used to remove the mask material 14 through the openings in the photoresist down to the surface of the substrate 12. The photoresist layer is then removed and what remains is a pattern of openings 17 formed in the mask material 14. Alternatively, the photoresist layer can be applied to the optically clean surface of the substrate 12 and patterned through image reversal processes to yield openings 17 to the surface of the substrate 12. The mask material 14 can then be applied over the photoresist pattern for instance by an evaporation technique, subsequent dissolution of the photoresist layer lifts off the unwanted mask material 14.

Figure 2:
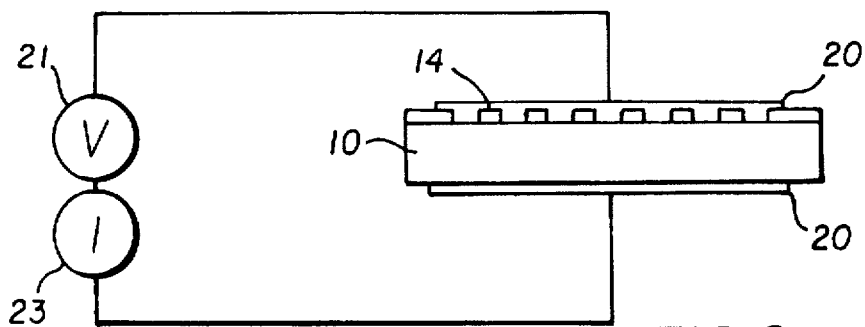
FIG. 2 shows a structure for applying electric field across the device of FIG. 1.

As shown in FIG. 2, a conductive contact 20 is now applied to both surfaces of the substrate 10. This conductive contact 20 can be composed of dissolved salts, such as Mg(NO$_3$)$_2$·6H$_2$O, MgSO$_4$, NaCl, and other soluble alkali and alkaline earth salts in water and metals, such as Au, Al, Ag, Pt, Ta etc. In one embodiment, the voltage source 21 supplies a ramped voltage. The current caused by the ramped voltage is sensed by a current monitor 23.

Figure 3:
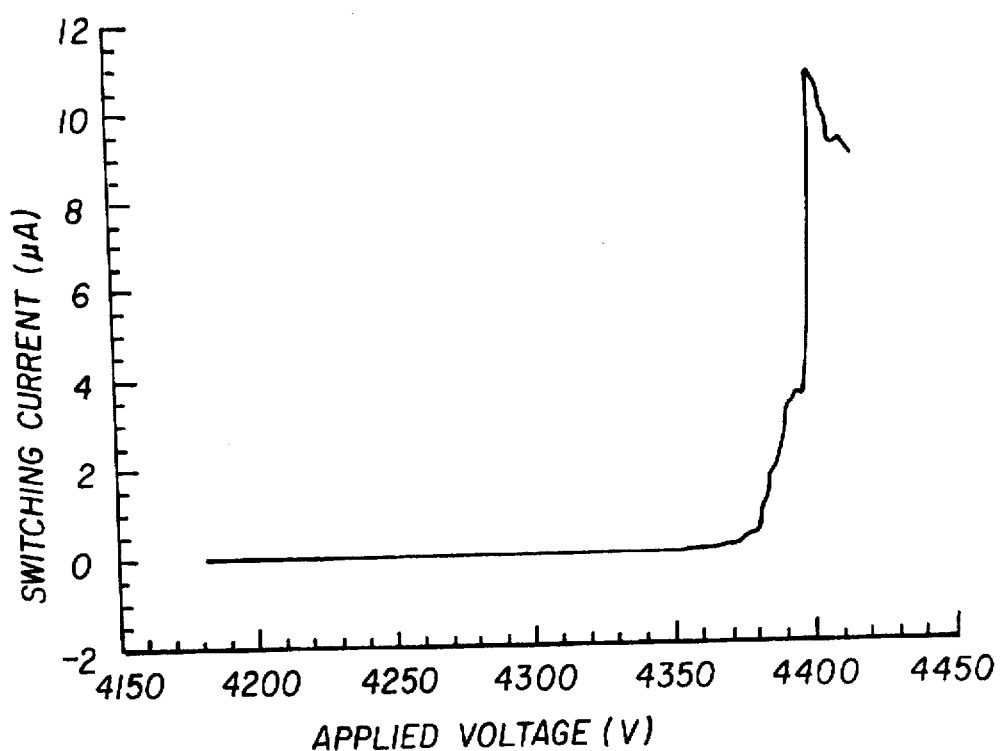
FIG. 3 is a plot of applied voltage versus switching current for the device of FIG. 2.

FIG. 3 depicts a typical ramped voltage on the x axis and the sensed current on the y axis. When the voltage from the source 21 is at a sufficient magnitude to cause ferroelectric domain regions to invert, the magnitude of the current increases. The total charge which flows is proportional to the dimensions of the inverted ferroelectric domain regions which is measured by the current sensor 23. As a result of this process, it has become clear that this increase in current flow can be predicted. By this manner, inversion of ferroelectric domains is monitored, and the voltage ramp is leveled off at the onset of current and subsequently turned off after a predetermined charge flow. This can be accomplished either manually or automatically. The applied voltage across the electrodes can be applied as DC, ramp or a pulse greater than the coercivity voltage and of a duration from 0.00001 to 100,000 msec with a preferable range of 0.00001 to 10,000 msec.

Figure 4:
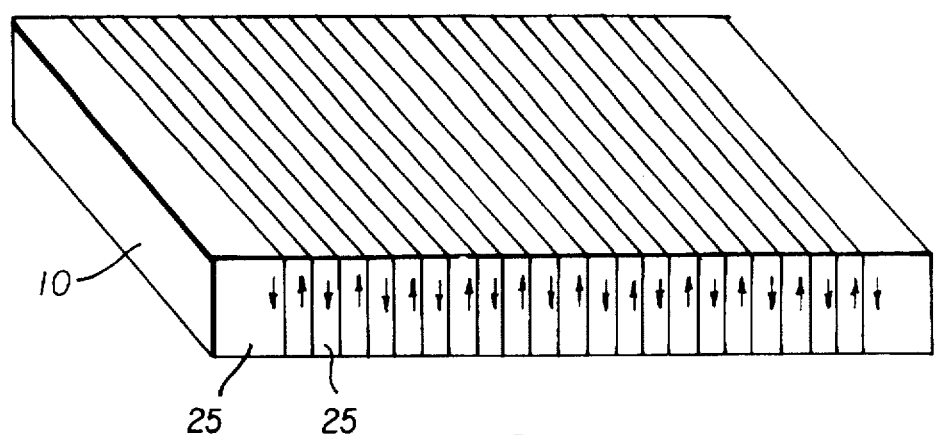
FIG. 4 shows the resultant inverted domain structure formed in the substrate of the device in FIG. 2.

The conductive contact 20 is now removed by immersion in suitable solvent such as water and dilute acid. The resultant device is shown in FIG. 4. It will be noted that there are arrows which alternate in different directions and these depict the direction of inverted domains 25 of the substrate 10.

Figure 5A:
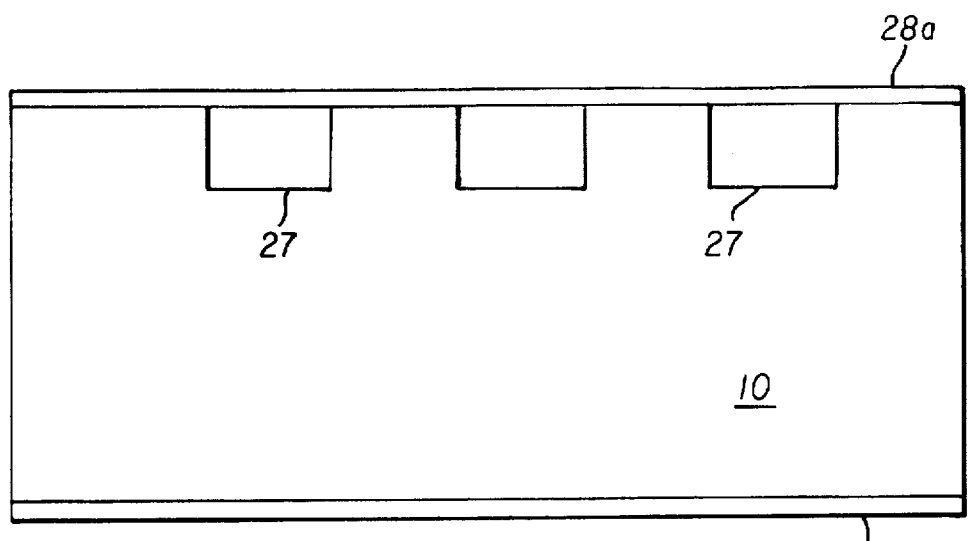
FIG. 5a is an embodiment using a grooved crystalline substrate.
Figure 5B:
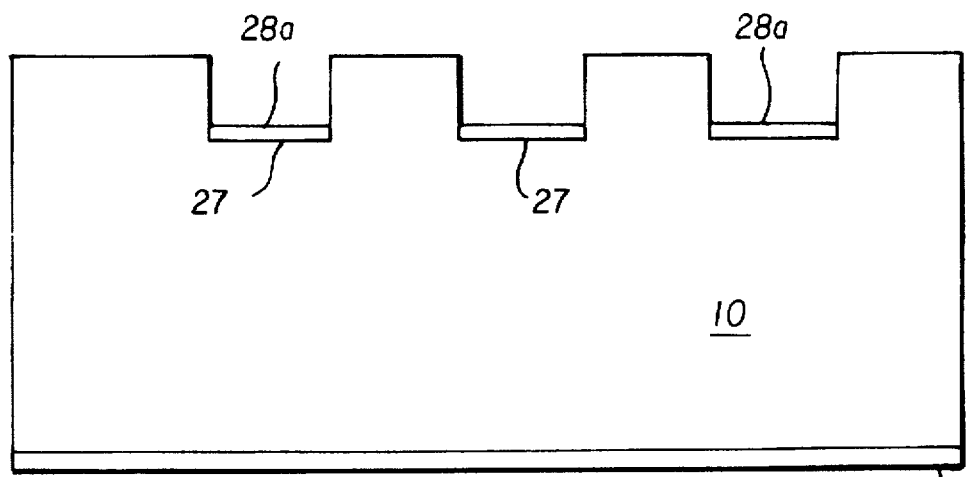
FIG. 5b is another embodiment similar to FIG. 5a, but with electrodes only in the grooves.
Figure 5C:
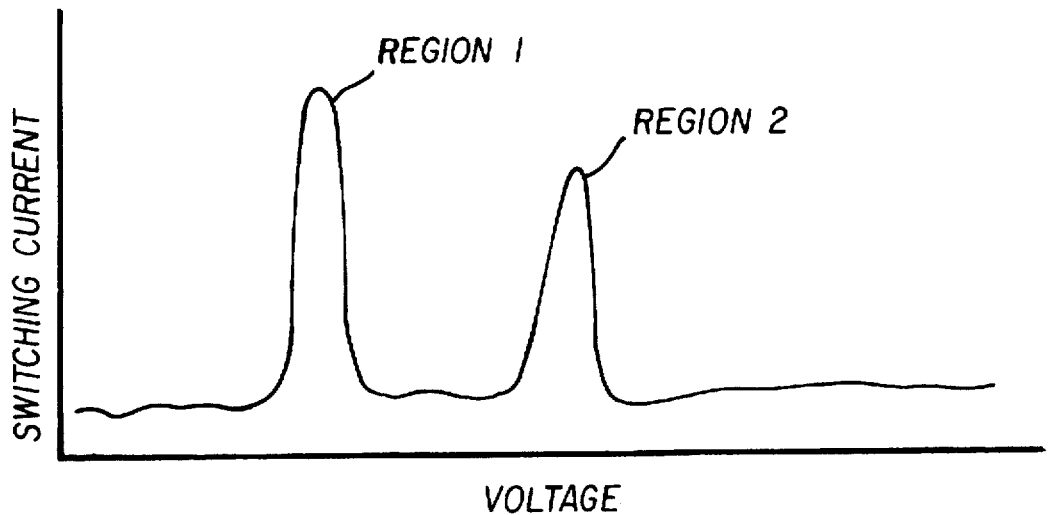

In another embodiment of the invention as shown in FIG. 5A grooves 27 are formed in a ferroelectric crystal substrate 10 in a periodic manner. The grooves are formed by patterning a mask material on the crystal surface. The mask material can be formed by photolithography process which includes coating of the photoresist, exposing it, developing the resist and ion etching. After etching the grooves, the mask layer is typically removed. Then conducting electrodes 28a and 28b are applied on both surfaces such that conducting electrode goes into the grooves. Then a high voltage is applied across the conductors to cause polarization reversal in localized regions. In some instances a pattern electrode is applied such that the conducting electrode 28a is only in grooved regions on one surface and a continuous electrode 28b on opposite surface as shown in FIG. 5B. When a ramped high voltage is applied then current breaks (FIG. 5C) can be observed at two distinct voltages corresponding to polarization reversal of region 1 and region 2. This structure causes polarization reversal in selected regions by controlling voltage.

Figure 6:
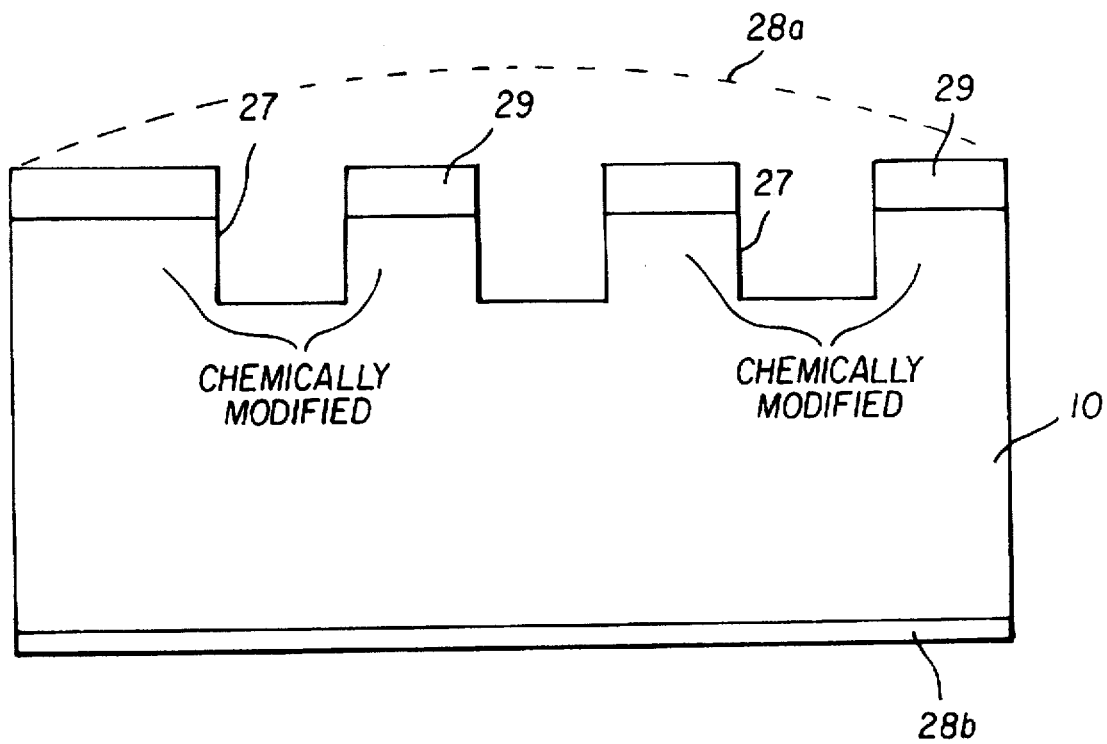
FIG. 6 is another device structure in accordance with the present invention.

In another embodiment of the invention as shown in FIG. 6, the crystal surface is chemically modified then a patterned dielectric layer 29 is formed and patterned is transferred to chemically modified layers of ferroelectric crystal. This method forms grooves in the crystal and chemically modified surface and dielectric layer remains in selected regions. Then a conducting layer is applied conformally to both surfaces. Then a high voltage is applied to cause polarization reversal in the ferroelectric crystal. In some instances the dielectric layer is removed before application of conducting electrodes.

Figure 7A:
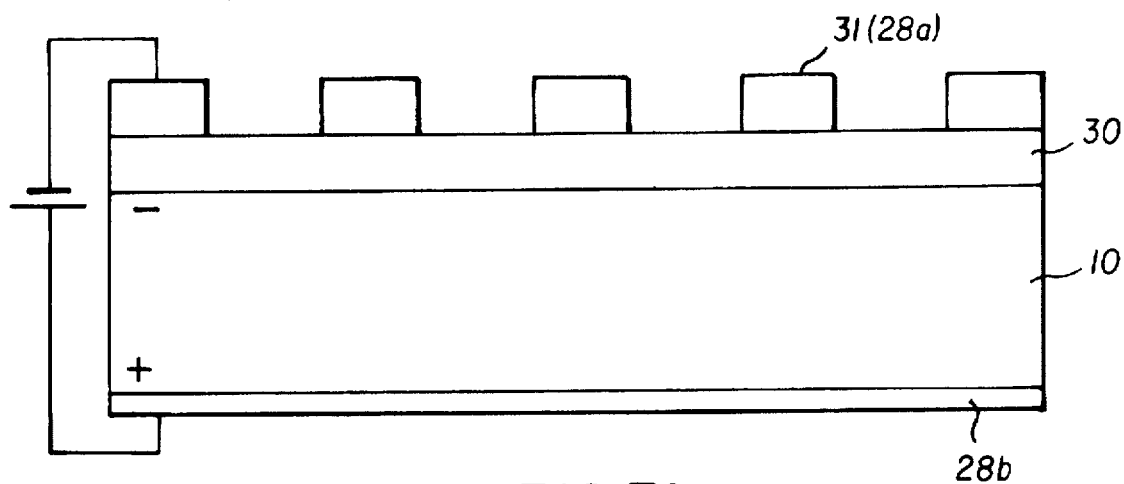
FIGS. 7a and 7b show still further devices in accordance with the present invention.
Figure 7B:
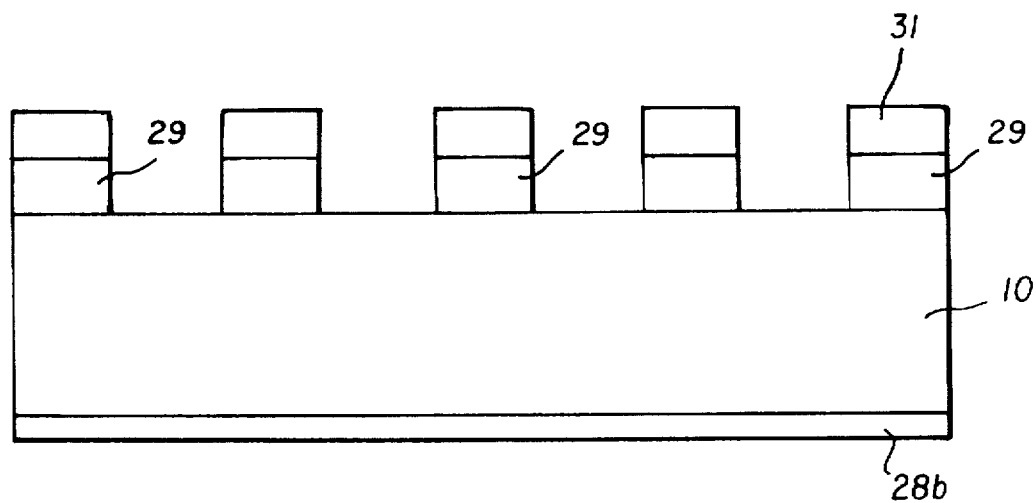

In another embodiment of the invention as shown in FIG. 7a, a dielectric layer 30 is formed on crystal surface, then a patterned conducting electrodes 31 are formed on top of the dielectric layer 30 and a continuous electrode 28b on other surface. A high voltage is then applied to conducting electrodes to cause polarization reversal. The dielectric layer 30 modifies the electric filed distribution compared to the case where metal electrode is formed directly on the crystal surface. In some instances the dielectric layer 29 and metal electrodes 30 are patterned as shown in FIG. 7b.

EXAMPLES

To determine domain inversion in the devices prepared in the examples which follow, the devices were sliced and polished in cross section along the xz plane. Devices were etched in 90 degree HF and $HNO_3$ in 1:2 ratio for 5 to 10 minutes. The +z oriented and −z oriented domains etch at different rates along the y axis revealing the domain structure.

EXAMPLE 1

A SAW grade z-cut crystal of $LiTaO_3$ with optically polished surfaces 0.5 mm thick was purchased and cut into 1.4 cm squares. 5000 Å of $Ta_2O_5$ was sputtered onto the −z surface. Then a 1500 Å of indium tin oxide (ITO) was deposited by sputtering. Photoresist was contact exposed through a grating mask of 3.6 µm period. The exposed photoresist was developed and postbaked to harden it. The ITO was etched in $CF_4$ and oxygen plasma etching. Then $Ta_2O_5$ was etched by freon plasma (reactive ion beam etching). After etching, the photoresist was removed, and a $Ta_2O_5$ grating mask remained on the substrate surface.

Conductive electrodes composed of 2.0 gm $Mg(NO_3)_2 \cdot 6H_2O$ dissolved in 20 ml $H_2O$ were applied as droplets to both sides of the substrate and continuity was established with brass probes. The voltage across and current through the substrate were monitored and also the current monitored versus time. A DC ramp of approximately 100 to 200 volts per second was applied up to approximately 10 KV at which time the ramp was decreased to approximately 10 to 30 volts per second. Upon the current increase due to the onset of domain inversion, the DC voltage was held constant for several seconds and after sufficient charge had passed the circuit opened to stop current flow. The conductive electrodes were washed off with water. The resultant inverted domain pattern grating was within the contact area of approximately 8 mm×8 mm.

EXAMPLE 2

A z-cut $LiTaO_3$ crystal was cleaned and coated with a 0.5 µm thick photoresist layer. The photoresist was patterned with a 3.6 µm period by exposing with UV light and was developed. Then the sample was etched by Argon ion beam for 30 minutes to produce 0.5 µm deep grooves in the crystal surface. Remaining photoresist was then removed. Liquid electrodes were applied to both surfaces and polarization reversal was achieved by application of high voltage.

The invention has been described in detail with particular reference to certain preferred embodiments thereof, but it will be understood that variations and modifications can be effected within the spirit and scope of the invention.

| PARTS LIST | |
|---|---|
| 10 | crystal substrate |
| 12 | optically clean surface |
| 14 | mask material |
| 17 | openings |
| 20 | conductive layer |
| 21 | voltage source |
| 23 | current sensor |
| 25 | inverted domains |
| 27 | grooves |
| 28a | conducting electrodes |
| 28b | conducting electrodes |
| 29 | patterned dielectric layer |
| 30 | dielectric layer |
| 31 | metal electrodes |

We claim:

1. A method for forming inverted ferroelectric domain regions in a substrate including ferroelectric material and having two major opposite surfaces, comprising the steps of:
   a. depositing a high electrical breakdown layer with high dielectric constant on a substrate surface typically between 0.5 µm to 1.0 µm thick;
   b. applying conductive electrodes on the dielectric layer and the other substrate surface respectively; and
   c. providing a voltage across the conductive electrodes having a sufficient magnitude and duration to cause the ferroelectric polarization to invert in a controlled manner.

2. The method of claim 1 further including:
   d. patterning the dielectric layer with periodic gratings wherein the grating have a period of at least 3 µm and including patterned grooves having a depth of at least half a micron.

3. The method of claim 1 wherein the dielectric layer includes a plurality of layers of different materials.

4. The method as set forth in claim 1 wherein the voltage is applied as DC, ramp, or a pulse of magnitude equal to or greater than the coercive voltage of the ferroelectric material and of duration from 0.00001 to 10.000 msec.

5. The method of claim 1 wherein the substrate is at a temperature up to Curie temperature.

6. The method as set forth in claim 1 wherein the dielectric layer includes an organic or inorganic nonconducting layer.

7. The method as set forth in claim 1 wherein the voltage is applied as DC, ramp, or a pulse of magnitude equal to or greater than the coercive voltage of the ferroelectric material and of a duration from 0.00001 to 100.000 msec.

8. The method of claim 1 wherein the dielectric layer is selected from the group consisting of $Ta_2O_5$, $WO_3$, $HfO_3$, and diamond like carbon.

9. The method of claim 1 wherein the dielectric layer has a thickness range of from 0.2 µm to 5 µm.

10. The method of claim 1 wherein the dielectric layer is selected so that interface between dielectric layer and substrate is changed in such a way that no domain inversion occurs under the dielectric layer by application of the voltage.

11. The method of claim 1 wherein the deposited dielectric layer is patterned to form dielectric pads which are at least 0.2 µm thick.

12. The method of claim 1 wherein the substrate is selected from but is not limited to the group consisting of $LiNbO_3$, $LiTaO_3$ and KTP.

13. A method for forming inverted ferroelectric domain regions in a ferroelectric substrate, comprising the steps of:
   (a) etching the substrate to form grooves, so that domain inversion is inhibited in selected regions;
   (b) applying a conducting electrode on both surfaces of the substrate; and
   (c) providing a voltage to the conductive electrodes having sufficient magnitude and duration to cause the ferroelectric polarization to switch.

14. The method of claim 13 wherein the electrode is deposited in the grooves.

15. The method of claim 13 wherein one of the surface of the substrate is chemically modified and includes a periodic dielectric layer on such chemically modified surface.

16. A method for forming inverted ferroelectric domain regions in a ferroelectric crystal, comprising the steps of:
   (1) depositing a dielectric layer on the ferroelectric crystal and providing a patterned metal electrode on said dielectric layer; and
   (2) applying a voltage to the metal electrode.

17. The method of claim 16 wherein the dielectric layer is patterned in the same location as the electrode.

* * * * *